Enlaw & Richmond,
Circular Saw Mill.
Nº 26,176. Patented Nov. 22, 1859.
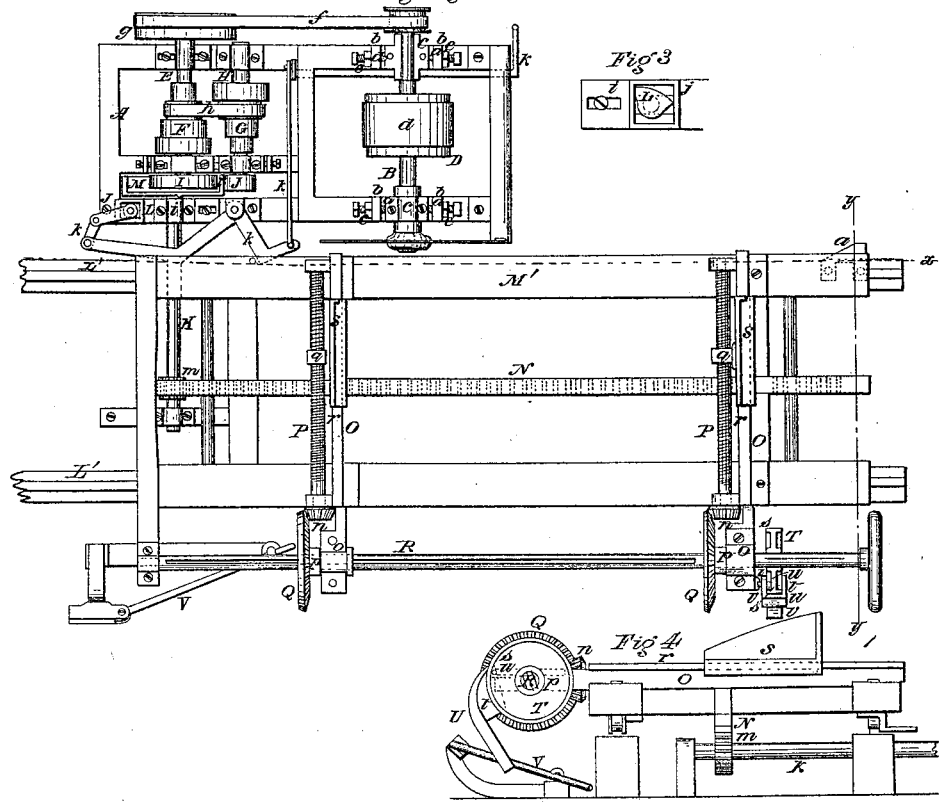
Witnesses:
P. Van den Berg
John Fuite
Inventors:
A. J. Enlaw
Elliott Richmond

UNITED STATES PATENT OFFICE.

A. J. EMLAW, OF GRAND HAVEN, AND E. RICHMOND, OF KELLOGGSVILLE, MICHIGAN.

SAWMILL.

Specification of Letters Patent No. 26,176, dated November 22, 1859.

*To all whom it may concern:*

Be it known that we, ANDREW J. EMLAW, of Grand Haven, in the county of Ottawa and State of Michigan, and ELLIOTT RICHMOND, of Kelloggsville, in the county of Kent and State of Michigan, have invented certain new and useful Improvements in Sawing-Machines; and we do hereby declare that the following is a full, clear, and exact description of the same, reference being had to the annexed drawings, making a part of this specification, in which—

Figure 1, is a longitudinal vertical section of our invention taken in the line $x, x$, Fig. 2, and looking in the direction indicated by the arrows. Fig. 2, is a plan or top view of the same. Fig. 3, is a detached plan view of a portion of the same. Fig. 4, is a transverse vertical section of the same taken in the line $y, y$, Fig. 1.

Similar letters of reference indicate corresponding parts in the several figures.

This invention relates to certain improvements in that class of sawing machines in which circular saws are used.

To enable those skilled in the art to fully understand and construct our invention we will proceed to describe it.

A, represents a frame in which the arbor B, of a circular saw is hung together with the working parts directly connected therewith. The arbor B, is not hung between center points as usual but is fitted in boxes C, C, which are fitted between center points $a, a$, as shown clearly in Fig. 2, the center points at one side fitting in oblong slots $a'$ in the boxes the center points passing through uprights $b$, attached to the frame, and having jam nuts $c$, on them to prevent their casual turning. By this arrangement it will be seen that the saw arbor may be adjusted at any time so as to keep the saw in a proper relative position with its work, and all side cramp prevented. On the arbor B, a pulley D, is placed, over which a belt $d$, passes from a proper driving shaft.

On the outer end of arbor B, a pulley $e$, is placed, and a belt $f$, passes around this pulley and a pulley $g$, on a shaft E, in the frame A. On the shaft E, there is a set of cone pulleys F, and a set G, of cone pulleys is placed on a shaft H, which is placed in the frame A, parallel with shaft E. These cone pulleys have a belt $h$, passing around them. On the inner end of shaft E, a pulley I, is placed, and a smaller pulley J, is placed on the corresponding end of shaft H, as shown clearly in Fig. 2.

K, is a shaft which is placed transversely with carriage wings L', and has one of its bearings in the frame A. The bearing $i$, is adjustable, that is to say, it is allowed to move on the frame A, and the movement is effected when necessary by a cam L, which is fitted in a yoke $j$, on the bearing $i$, the cam being moved by a system of levers $k$, which are shown clearly in Fig. 2. On the end of the shaft K, at the outer side of the bearing $i$, a wheel M, is placed. This wheel is formed of a circular disk provided with a flanch $l$, at its edge, the flanch projecting from it at right angles and encompassing the pulley I, of the shaft F, the flanch $l$, being between the pulleys I and J, as shown clearly in Fig. 2.

The wings L', are arranged in the usual way and a carriage M' of usual construction is placed thereon and driven or moved by the shaft K, and a pinion $m$ thereon which gears into a rack N, secured longitudinally to the under side of the carriage M. On the carriage M', two bars O, O, are placed transversely, and to each bar O, a screw shaft P, is fitted and allowed to turn freely in its bearings. To one end of the screw shafts bevel pinions $n$, are attached, one to each, and these pinions gear into bevel wheels Q, that are placed on a shaft R, at one side of the carriage and longitudinally with it. The wheels Q, while turning with the shaft R, are allowed to slide on it, the wheels being secured on the shafts by feathers which fit in a longitudinal groove in the shaft. The outer ends of the bars O, O, are attached by bearings on collars $o$, to hubs $p$ of the wheels Q.

To each screw shaft P, a head or plate S, is attached by a nut $q$, the heads being fitted on flanches $r$, on the upper edges of the two bars O, and allowed to slide freely thereon under the action of the screw shafts. On the shaft R, a pulley or wheel T, is firmly keyed. This pulley or wheel has a rim $s$, which projects from it at either side at right angles as shown clearly in Fig. 2. And on this pulley or wheel T, a pawl or clutch U, is placed or secured. The pawl or clutch U, is formed of a bar having a side piece or flanch $t$, at each side and projecting down at each side of the wheel or pulley and pins $u$, pass through the flanches t, and project underneath the rim s, as shown clearly in Fig. 2.

To the flooring of the mill or base of the machine an inclined bar V, is attached, the use of which will be presently explained. To one side of the bearing o, adjoining the wheel T, a stop v, is attached, and an oblique projection w, is attached to one end of the carriage M'.

The operation is as follows: Motion is given the saw arbor B, from the driving shaft by means of the belt d, and the carriage M', is operated by the pinion m, on shaft K, gearing into the rack N. The shaft K, being rotated from either shaft E, or H, according as the wheel M, is adjusted. If said wheel is adjusted by means of the levers k, cam L, and yoke j, to press against the pulley J, of shaft H, the carriage will be fed toward the saw and the log or other stuff to be sawed presented to the saw with a proper feed movement. If the wheel M, is adjusted in gear with the larger pulley I, of shaft E, a quick gigging back movement is obtained. The cam L, however is operated by hand only in certain cases where a reverse movement is required during the action of the saw on the stuff. In other cases the wheel M, is operated automatically at the termination of each movement of the carriage M', by the oblique projection u, at one end of the carriage and a pendent pin w', at the opposite end, the projection and pin actuating the levers k. The bars O, O, in consequence of being attached to the hubs p, of the wheels Q, and the latter allowed to slide on the shaft R, may be adjusted at a greater or less distance apart, according to the length of the stuff to be sawed. The log or stuff is fed laterally to the saw at the termination of the gigging back movement of the carriage M', in consequence of the inclined bar V, throwing up the outer end of the pawl or clutch U, the latter as it rises clutching the rims s, and turning the shaft R, which by means of the gearing O, n, rotates the shafts P, P, the latter of course actuating the nuts q, and heads S, and consequently the log.

Having thus described our invention what we claim as new and desire to secure by Letters Patent is—

1. The arrangement of the friction wheel M, and pulleys I, J, in connection with the shafting E, H, K, for the purpose of giving the feed and gigging back movement to the carriage M', as set forth.

2. The arrangement of the adjustable bars O, on the carriage M, screw rods P, and adjustable wheels Q, on shaft R, whereby the bars O, may be adjusted nearer to or farther from each other to suit the length of the stuff to be sawed.

ANDREW J. EMLAW.
ELLIOTT RICHMOND.

Witnesses:
WILLIAM HUMPHREY,
M. J. EMLAW.